United States Patent Office 3,605,643
Patented Sept. 20, 1971

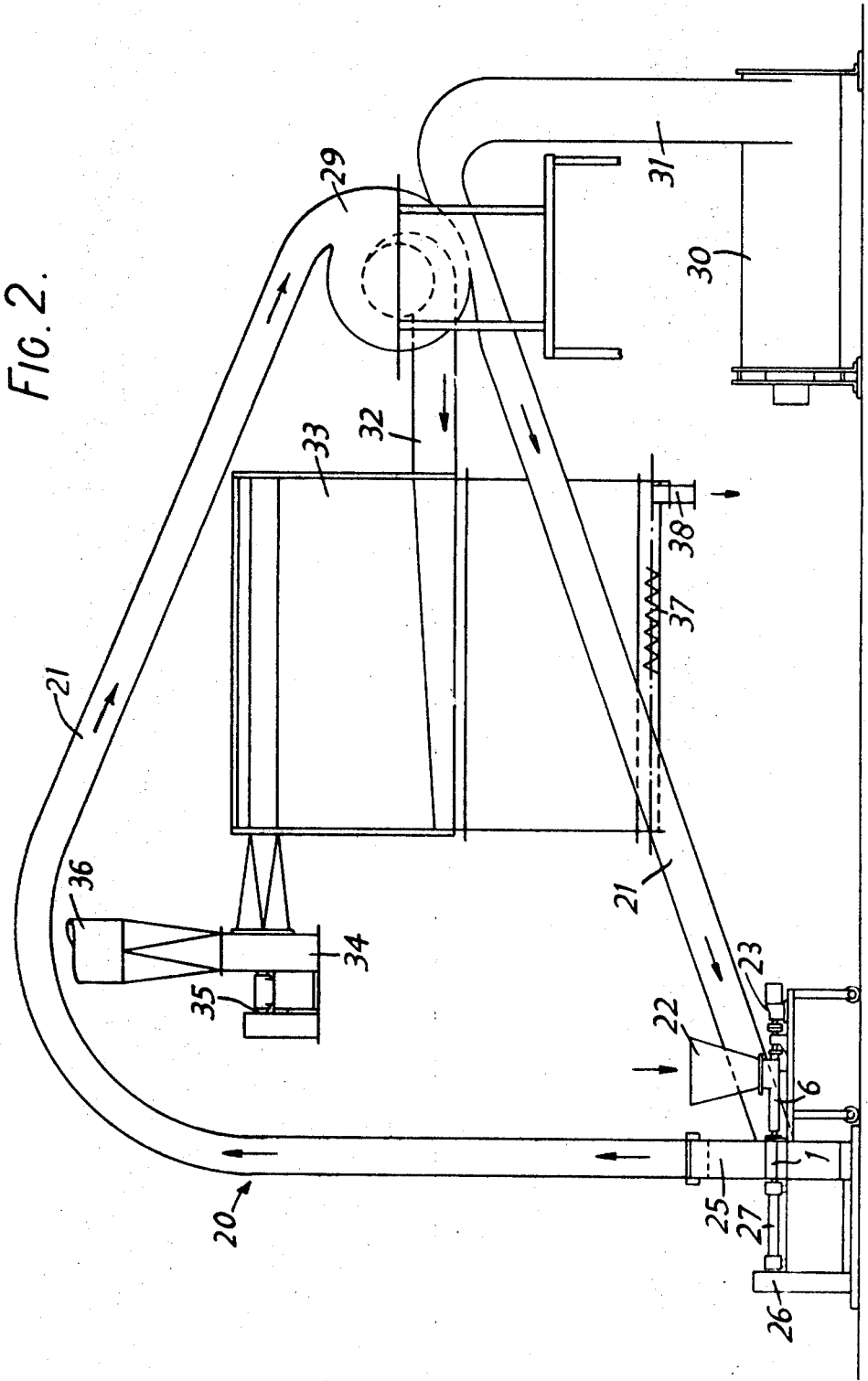

3,605,643
APPARATUS FOR THE TREATMENT OF PASTY SUBSTANCES
Peter Joachim Barr, London, England, assignor to Barr & Murphy Limited, London, England
Filed Feb. 3, 1970, Ser. No. 8,265
Claims priority, application Great Britain, Feb. 20, 1969, 9,342/69
Int. Cl. A21c 5/00; B29c 7/00
U.S. Cl. 107—8DA                   4 Claims

ABSTRACT OF THE DISCLOSURE

An apparatus for forming pasty substances such as wheat gluten into pellets having means for forming the pellets in a mould cavity in a rotating member and positively expelling the pellets thus formed by compressed air pressure. The apparatus is employed in a process for the drying of such substances wherein the substance in the form of pellets is introduced into a stream of heated air circulating in a closed path and is subjected to disintegration action whilst suspended in the air stream.

---

Figure 1:
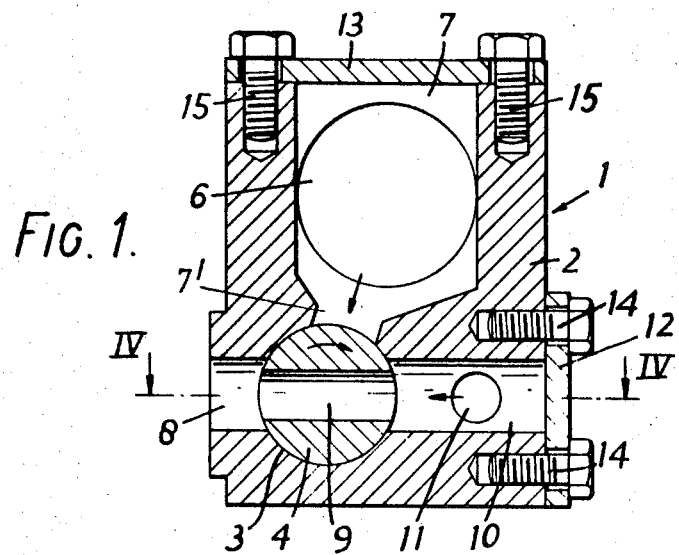

The present invention relates to apparatus and process for the treatment of pasty or semi-solid substances and in particular to apparatus for forming such material into discrete pellets and to a process for drying such substances.

It is desirable when drying any substance to increase its surface area so that evaporation can take place more quickly. It is an object of the present invention to provide a means whereby a mass of a pasty substance may be converted into a plurality of pellets of relatively high surface area. These pellets may then be treated as required, for example, by introduction into a pneumatic dryer.

The drying of pasty substances is a process of considerable commercial importance: wheat gluten is typical of products which are separated as a damp pasty mass and which require drying to a final product of low moisture content. It should be made clear that by a pasty substance is meant a semi-solid composition which will flow under pressure but may be shaped into separate coherent pellets.

One known method for drying pasty substances involves entraining small lumps in a pneumatic dryer in which they are carried, conveyed and dried by a stream of heated air which is drawn through a conduit of the dryer. The pasty mass is fed into the pneumatic dryer through a disintegrator which assists or effects the reduction of the material into small lumps, thus increasing the surface area from which evaporation may take place. One method of reducing a pasty mass of gluten into lumps sufficiently small for entraining in a stream of air is to introduce one part of wet gluten, with two parts of already dried material, into a paddle mixer or the like where, by thorough mixing, the material becomes sufficiently dried to permit it to be distintegrated into small particles when introduced into a standard disintegrater associated with the pneumatic dryer.

The water content of wet gluten produced by treatment of wheat flour is 70% by weight and that in the dried material 5%. This means that the proportion by weight of "dried" to "undried" solid in the mixer is more than 6:1 and so on average, each particle of the material will pass through the dryer at least seven times. This is undesirable since in common with many of the materials to which this method is appled wheat gluten is extremely heat sensitive.

The other main method already available is to pump the pasty substance directly into a mechanical disintegrator. The disadvantage of this method is that the disintegrator has to do a considerable amount of work to produce, from a continuous or semi-continuous stream of paste, lumps of an average size small enough to be entrained in the air flow of the dryer. This means that disintegrator consumes large quantities of power.

The pelletizer apparatus of the present invention, when used ancillary to the disintegrator reduces the latter's power consumption by a very considerable proportion whilst consuming negligible power itself.

According to the invention there is provided apparatus for producing pellets from pasty substances comprising a body, a shaft rotatably mounted in the body and having at least one cross bore formed therein, said body including a material supply chamber to receive pasty material supplied under pressure and having a port with which the cross bore in the shaft comes into register at one angular position, an air inlet chamber having an air inlet port, and a pellet outlet, opposite ends of said cross bore coming into register with said air inlet port and said outlet at a second angular position of said shaft whereby a pellet of pasty material is expelled from said cross bore by the pressure of air introduced into said air inlet chamber.

Preferably the shaft has a plurality of cross bores, which can be brought into and out of register with common ports in the form of elongated slots.

Preferably the angular width of at least the material support port in the body is greater than that of the cross bore, so that the full width of the cross bore is in register with said port for a finite time during rotation of the shaft.

According to another aspect of the present invention a process for the drying of pasty substances, such as wet gluten, in which the pasty substance is dried whilst suspended in a stream of heated air and circulated in a closed path and is subjected to disintegration action whilst so suspended is characterised in that the pasty substance is introduced into the stream of air in the form of discrete pellets, which become coated with partially dried material suspended in the circulating air stream before subjection to disintegration action.

Figure 4:
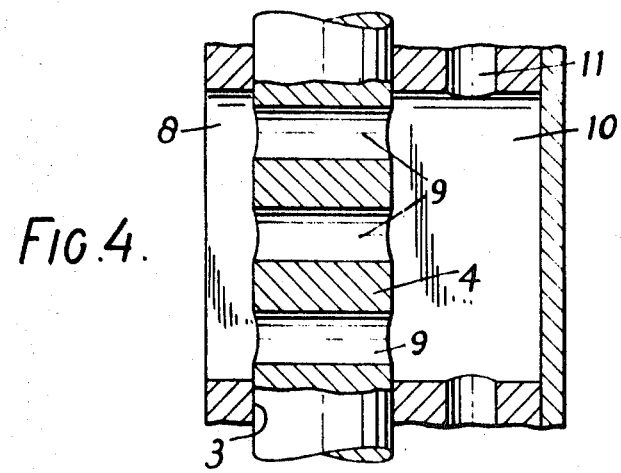
Figure 3:
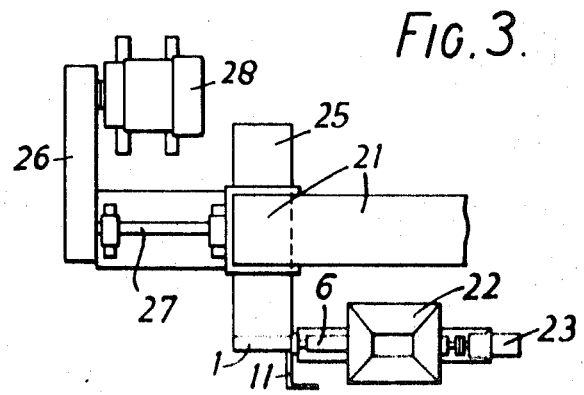

An embodiment of this invention will now be described, by way of example only, with reference to the accompanying drawings, in which:

FIG. 1 is a transverse section of a pelletizer made in accordance with the invention, FIG. 2 is a diagrammatic representation, in side elevation, of a ring dryer system incorporating a pelletizer according to the invention, FIG. 3 is a diagrammatic representation in plan view of part of the ring dryer of FIG. 2, and FIG. 4 is a sectional plan of the pelletizer of FIG. 1 showing the ports and the outlet.

In FIG. 1 is shown a pelletizer 1, comprising a main body 2 and end plates 12, 13 secured to the body 2 by bolts 14, 15 respectively. Within the body 2 is a bore 3 in which is located a shaft 4 which can rotate about its axis in the bore 3. The shaft 4 has a plurality of diametrical cross bores 9 along its length which can be brought into register with a material supply port 7', an air inlet port and chamber 10, and an outlet port and chamber 8 upon rotation of the shaft 4. The supply port 7' leads to a chamber 7 connected to a source of the paste by a supply pipe 6. The air inlet chamber 10 is supplied from a compressed air source through a tube 11. As shown in FIG. 4, the ports 7' and 10 and the outlet 8 are in the form of elongated slots communicating with the bore 3 and so are common to all the cross bores 9.

The pasty substance is normally pumped into the supply chamber 7 to maintain a substantial pressure in the chamber 7 with the result that the cross bores 9 fill rapidly when they come into register with the supply port 7'. The fit of shaft 4 in the bore 3 is such that air can escape from the end of the bores remote from the supply port 7' during filling whilst at the same time preventing leakage of pasty material. The supply port 7' is of an angular width substantially larger than the diameter of the bores 9; this is to facilitate complete filling of bores 9 whilst in register with the port and it should be noted that the width of ports 10 and 8 are similarly larger so that interaction with the bores 9 is prolonged.

The shaft 4 may be driven by any known means and with the diametrical bores 9 acts as a valve. Consider the shaft 4 rotating in the direction of the arrow in FIG. 1. When the bore 9 is just past vertical it is filled with paste under pressure from the chamber 7 through port 7'. On further rotation of the shaft 4 the supply of paste to bore 9 is cut off and subsequently the compressed air in the chamber 10 ejects a pellet of paste through the outlet chamber 8 at high velocity. It should be noted that two pellets are formed and ejected in each bore 9 during each revolution of the shaft 4. In a particular pelletizer with fifteen bores 9 each of diameter ½" the shaft 4 rotates at one hundred r.p.m. thus producing three thousand pellets per minute. The bores 9 may be arranged in the shaft 4 parallel with one another, as shown in FIG. 4, so that pellets are ejected only twice per revolution of shaft 4 or they may be angularly arranged about the axis of shaft 4 so that a more continuous production of pellets is achieved.

As indicated earlier the pelletizer may, with particular advantage, be used in conjunction with the disintegrator of a pneumatic dryer. FIGS. 2 and 3 show details of a ring dryer with disintegrator which incorporates the invention.

A ring dryer 20 (FIG. 2) with a disintegrator 25 which may be of any suitable type is shown comprising a ring duct 21, a heater 30 and intake duct 31. An input feed hopper 22 is provided for introducing the wet paste into the dryer 20. This is accomplished by means of a pump 23 which supplies paste under pressure directly to the input pipe 6 of the pelletizer 1 which is mounted so that the pellets ejected from it enter the dryer near the disintegrator 25. This disintegrator 25 is driven through shaft 27 and gears or pulleys in housing 26 by motor 28 (FIG. 3). The drive for the pelletizer is not shown. The disintegrator 25 is so positioned that the full circulating flow of heated drying air and material passes through it entraining wet paste particles in the process. This flow is produced by fan 34 driven by motor 35, typically 100 H.P., positioned adjacent to the exhaust 36. The manifold 29 separates by centrifugal force, only the lighter and smaller and hence drier particles entering duct 32 to the filter 33 where they are separated from the exhaust air and may be collected at outlet 38 with the aid of screw conveyor 37. The heavier particles recirculate until they are eventually dried and reduced in size.

The wet pellets entering the system from the pelletizer become coated in hard, partially dried particles, so that they do not become adhered to the blades of the disintegrator with which they come into contact. To further facilitate this the pelletizer may be positioned on the outlet side of the disintegrator so that the wet pellets complete one circuit of the dryer before first coming into contact with the blades of the disintegrator. The partially dried pellets become increasingly brittle as they are circulated around the ring dryer system so that in subsequent passes through the disintegrator they become broken down into small particles, which become progressively dried and lighter.

I claim:

1. Apparatus for producing pellets from pasty substances comprising a body, a material supply chamber in said body to receive pasty material supplied under pressure, an air inlet chamber in said body and connectable to an air pressure source, a shaft rotatably mounted in a bore in said body, said material supply chamber and said air inlet chamber being connected to said bore by material supply port means, at least one cross bore formed in the shaft and arranged so that at a first angular position one end of the cross bore comes into register with said material supply port means and at a second angular position one end of said cross bore comes into register with said air inlet chamber and the other end of said cross bore comes into register with a pellet outlet whereby a pellet of pasty material is expelled from said cross bore through said outlet by the pressure of air introduced into said air inlet chamber.

2. Apparatus as claimed in claim 1, wherein a plurality of cross bores is formed in the shaft and said material supplied port means, said air inlet chamber and said pellet outlet are in the form of elongated slots provided in said body.

3. Apparatus as claimed in claim 1 wherein the angular width of at least the material supply port means is greater than that of the cross bore, so that the full width of the cross bore is in register with said port means for a finite time during rotation of the shaft.

4. Apparatus for producing pellets from pasty substances for introducing into a stream of air in a duct comprising a body, a material supply chamber in said body to receive pasty material supplied under pressure, an air inlet chamber in said body and connectable to an air pressure source, a shaft rotatably mounted in a bore in said body, said material supply chamber and said air inlet chamber being connected to said bore by material supply port means, at least one cross bore formed in the shaft and arranged so that at a first angular position one end of the cross bore comes into register with said material supply port means and at a second angular position one end of said cross bore comes into register with said air inlet chamber and the other end of said cross bore comes into register with a pellet outlet in communication with said air duct whereby a pellet of pasty material is expelled from said cross bore through said outlet by the pressure of air introduced into said air inlet chamber, said pellet outlet being adapted for connection to a ring dryer system including said air duct.

References Cited
UNITED STATES PATENTS

| | | | |
|---|---|---|---|
| 1,763,487 | 6/1930 | Taylor | 107—15AB |
| 1,784,559 | 12/1930 | Van Houten | 107—15AB |

PRICE C. FAW, JR., Primary Examiner

U.S. Cl. X.R.

18—2.5RR; 107—15A, 17